J. H. NOLAN & B. FITZPATRICK.
TRANSPLANTER AND FERTILIZER.
No. 191,364. Patented May 29, 1877.
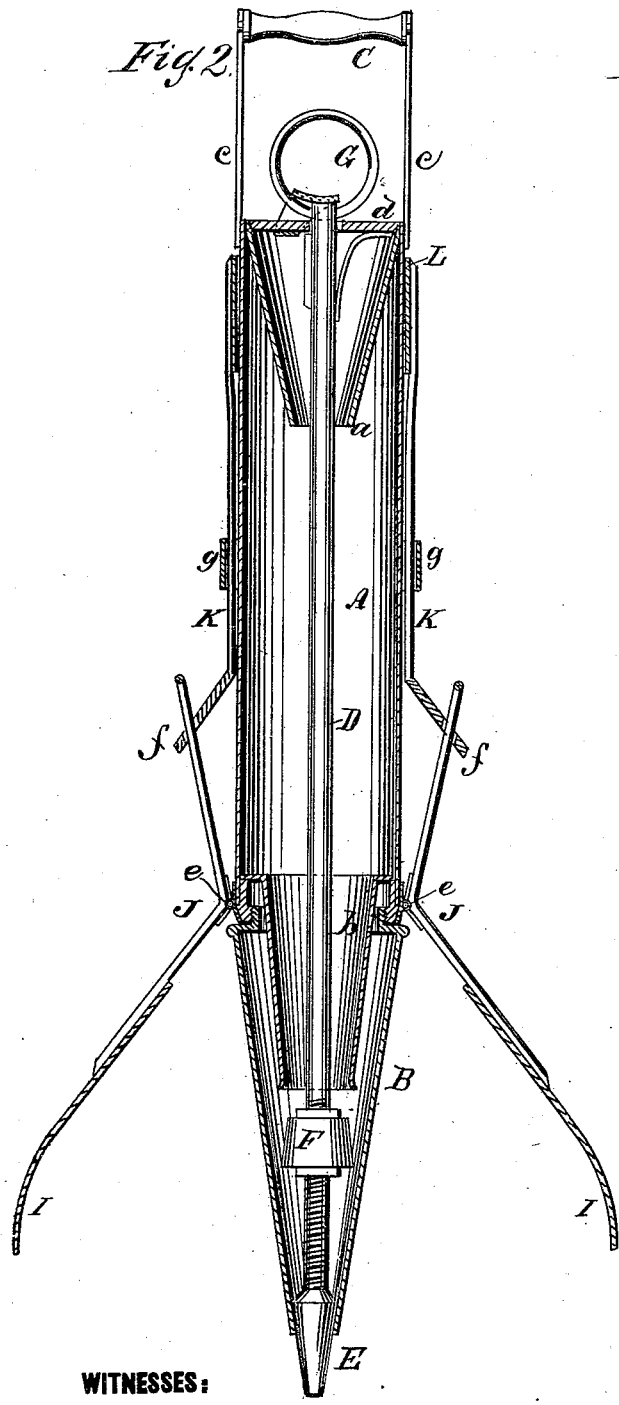
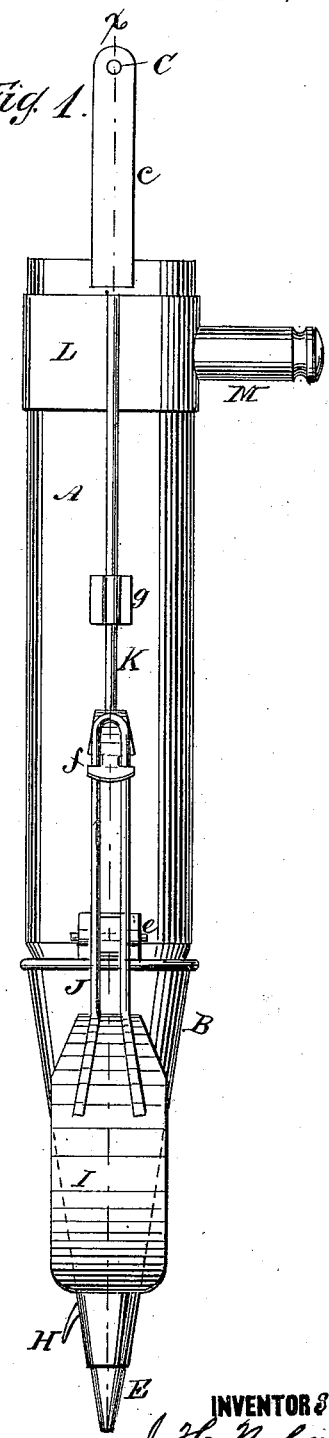

UNITED STATES PATENT OFFICE.

JOHN H. NOLAN AND BENJAMIN FITZPATRICK, OF CHAMBERS COUNTY, ALABAMA.

IMPROVEMENT IN TRANSPLANTER AND FERTILIZER.

Specification forming part of Letters Patent No. 191,364, dated May 29, 1877; application filed April 23, 1877.

*To all whom it may concern:*

Be it known that we, JOHN H. NOLAN and BENJAMIN FITZPATRICK, of the county of Chambers and State of Alabama, (post-office West Point, in the State of Georgia,) have invented a new and Improved Transplanter and Fertilizer, of which the following is a specification:

Figure 1 is a side elevation. Fig. 2 is a longitudinal section on line $x\,x$ in Fig. 1.

Similar letters of reference indicate corresponding parts.

The object of our invention is to provide an implement for setting and fertilizing plants at one operation, which is simple in its construction, and which shall rapidly and effectively perform the work, thereby avoiding the slow and laborious process of hand-setting.

In the drawing, A is a tube, having the inwardly-projecting conical tube $a$ at its upper end, and the conical tube $b$ projecting from its lower end. B is a conical tube, that screws into the lower end of the tube A, and surrounds and extends below the tube $b$. A handle, C, is attached to the upper end of the tube A by means of straps $c$. A rod, D, extends centrally through the tubes A B, and is provided with the pointed valve E, which stops the lower end of the tube B, and it is also provided with an elastic valve, F, that is capable of stopping the lower end of the tube $b$.

The upper end of the rod D is guided by a cross-bar, $d$, at the upper end of the tube A, and is provided with a ring, G, by which it may be drawn upward. An elastic spring of rubber passes through the ring G and under the cross-bar $d$, and serves to draw the rod D downward.

H is a hook that is attached to the side of the conical tube B, and is designed for carrying plants into the earth. I I are wings attached to the bent slotted levers J, which are pivoted to the sides of the tube A at $e$.

Rods K, having notched heads $f$, that engage with the slotted ends of the levers J, are attached to a thimble, L, that surrounds the tube A, and are guided by the loops $g$ at the sides of the said tube. A handle, M, projects from the thimble L for moving the same.

The operation of our improved apparatus is as follows: The tube A is filled with a fertilizing liquid, and a plant is placed on the ground. The handle C is grasped by one hand and the handle M by the other. The instrument is forced into the earth, carrying the plant with it by means of the hook H. The rod D is now drawn upward until the valve F closes the tube $b$, and the valve E is opened, permitting a quantity of the fertilizer to escape. The valve E is allowed to close when the handle M is moved downward, forcing the wings I together, and carrying the earth around the plant.

The advantages claimed for the invention are the rapidity and facility and safety with which the operation of setting plants may be accomplished even in dry weather, and its economy in the use of fertilizers.

Having thus described our invention, we claim as new and desire to secure by Letters Patent—

1. The tube A, having the conical tubes $a$ $b$, the tube B, and the valves E F, having the common rod D, in combination, substantially as shown and described.

2. The wings I, bent slotted levers J, rods K, having the notched heads $f$, thimble L, and tube A, in combination, substantially as shown and described.

3. The combination of the hook H and tube B, substantially as and for the purpose herein shown and described.

JOHN H. NOLAN.
BENJAMIN FITZPATRICK.

Witnesses:
A. W. GRIGGS,
T. J. KENNEDY,
N. L. ATKINSON.